(No Model.)

J. L. FELDER.
PLOW.

No. 338,054. Patented Mar. 16, 1886.

Witnesses:
John M. Richardson
John T. Hopkins
R. T. Hopkins

Inventor:
Jno. L. Felder

UNITED STATES PATENT OFFICE.

JOHN L. FELDER, OF LEESBURG, TEXAS.

PLOW.

SPECIFICATION forming part of Letters Patent No. 338,054, dated March 16, 1886.

Application filed December 23, 1885. Serial No. 186,568. (No model.)

*To all whom it may concern:*

Be it known that I, JOHN L. FELDER, a citizen of the United States, residing at Leesburg, in the county of Camp and State of Texas, have invented a new and useful Improvement in Cultivators, of which the following is a specification.

The object of my invention is to provide a simple and efficient implement for cultivating young plants and for cutting cotton to a stand; and the invention consists in the construction and combination of devices, as hereinafter set forth.

Figure 3:
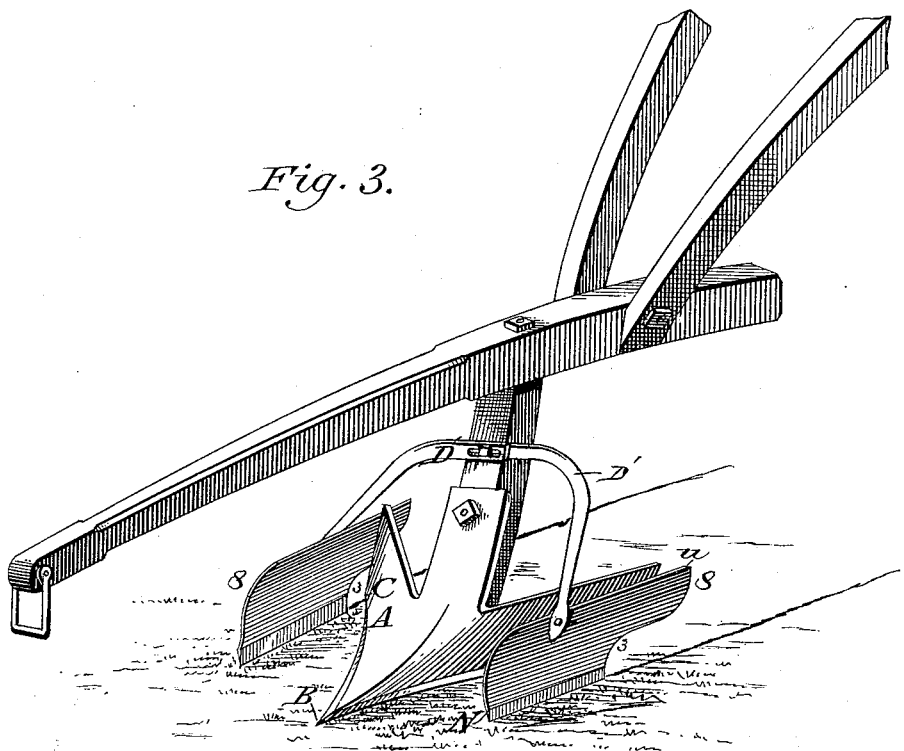
Figure 1:
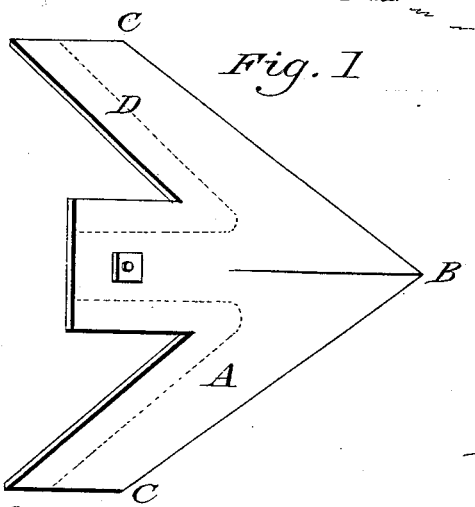
Figure 2:
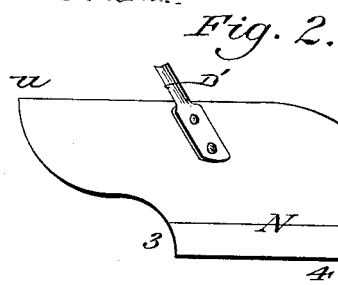
Figure 4:
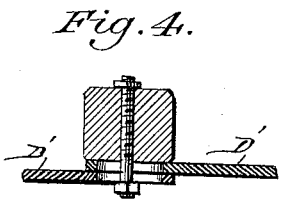

In the annexed drawings, illustrating the invention, Figure 1 is a view of a plow-point, which, when used for cutting cotton to a stand, should be of reduced dimensions, as indicated by dotted lines. Fig. 2 is a side view of a guide or fender. Fig. 3 is a perspective of my improved cultivator. Fig. 4 is a sectional detail view illustrating the manner of attaching the fender-shanks to the plow stock or standard.

A represents the wings, and B the sharpened forward extremity of the plow-point. This plow-point is formed on each side with a straight cutting-edge from the point B to the corners C, and has a central shanked portion, as usual, by which it is secured to the cultivator-frame. When used as a chopper or for cutting cotton to a stand, it will be reduced in dimensions, as indicated by the dotted lines D, the wings and stem being thus narrowed to allow the cuttings to fall readily from the plow, and thus avoid choking and dragging. On one or both sides of the plow-point is arranged a detachable guide or fender, N, the form of which is clearly shown in Figs. 2 and 3. This guide or fender N is attached to the plow-standard by means of a bent shank, D', having a slotted inner end for the passage of a bolt by which it is secured to the standard above the plow-point. The guide or fender N is curved or bent from above downward, as shown, and has a curved recess, 3, at its rear end, which is arranged slightly in advance of the plow-point corner C, to afford a passage for the earth thrown out by the plow-wings. The lower edge, 4, of the guide or fender is sharpened, as shown in Fig. 3. Its upper edge, *u*, is straight or horizontal, and each end 8 is rounded or curved.

As shown in Figs. 3 and 4, it will be seen that the slotted attaching ends of the shanks D' are made to overlap and are both secured to the plow-standard by the same bolt.

Either or both guides or fenders may be used, as desired; but in cutting cotton to a stand it is preferable to employ both in connection with a plow-point having narrow wings, as before mentioned.

What I claim as my invention is—

The combination, with a plow-point, of the curved guides or fenders recessed at their rear ends and provided with cutting lower edges, said fenders being detachably connected to the plow-standard, substantially as described.

JOHN L. FELDER.

Witnesses:
JOHN M. RICHARDSON,
JOHN F. HOPKINS.